United States Patent Office 3,772,237
Patented Nov. 13, 1973

3,772,237
VINYL PASTE SEALANT COMPOSITION
Allan R. Bullman, Bernardsville, N.J., assignor to Union Carbide Corporation, New York, N.Y.
No Drawing. Continuation of abandoned application Ser. No. 127,820, Mar. 24, 1971. This application May 17, 1972, Ser. No. 254,111
Int. Cl. C08f 45/40
U.S. Cl. 260—31.8 M                10 Claims

ABSTRACT OF THE DISCLOSURE

The invention encompasses a vinyl paste sealant which possesses excellent physical properties and adhesion to a variety of substrates. The critical ingredients of the sealant are a vinyl dispersion resin, a vinyl blending resin, a ketonealdehyde condensation resin; a filler, a plasticizer and a $NH_2$-organo-functional silane adhesion promoter.

---

This application is a continuation of U.S. application Ser. No. 127,820, filed Mar. 24, 1971, now abandoned.

This invention relates to the manufacture of vinyl paste sealant compositions which possess uniquely high adhesion to a wide variety of substrates. More particularly, this invention relates to a vinyl paste sealant composition, which may be a plastisol, an organosol, a plastigel or an organogel, which comprises a select combination of ingredients which together possess properties found most desirable from the standpoint of adhesion to a variety of substrates, handling characteristics and fusion performance. Most particularly, the composition of this invention is particularly desirable when employed upon freshly cured epoxy metal coatings.

A "sealant," broadly speaking, is a material which serves to keep out air and water from a substrate to which the material is applied. They are classically employed for the purpose of joining surfaces or filling spaces such as holes, channels, and the like. They are normally characterized by a lack of brittleness in much the same fashion as a caulk, except that they are typically more expensive and do not exhibit change upon aging. They are widely employed in the manufacture of automobiles for the purposes of joining metal parts, filling holes, filling drip rails, and the like. They are also employed to bond glass to glass, metal to glass, metal to metal, as well as a variety of other substrate surfaces. In this regard, they are usually not employed as a thin coating but rather in the form of a bead in order to provide the maximum surface juncture necessary to insure against passage of water or air into the space which is covered by the sealant.

Many sealant formulations are based upon vinyl pastes such as polyvinyl chloride plastisols, plastigels, organosols and organogels. These various vinyl compositions are characterized generically as "vinyl pastes," see Schildknecht, Polymer Processes, (1956) vol. X, pp. 552–554, Interscience Publishers, Inc., New York, N.Y. The use of vinyl chloride resins, which term includes vinyl chloride-vinyl acetate copolymers, in vinyl paste sealants is very well known. However, the usual vinyl paste sealant formulation is lacking in one or more of a number of properties which are regarded desirable in the commercial utilization of such sealants. For example, they may be deficient in adhesion to one or more of a variety of substrates: they may possess viscosity problems; they may cause sagging problems when applied; they may be difficult to apply; they may be lacking in physical properties such as tensile strength, modulus, elongation, surface hardness, and tear strength; or they may possess plasticizer migration characteristics.

A good vinyl paste sealant is one which is capable of bonding to a wide variety of substrates, particularly glass and metal. It is most desirable that such sealant is capable of bonding to metal or glass surfaces which have not been specially treated prior to application of the sealant. For example, a metal which contains oil on the surface is a difficult surface for one to bind a sealant to and, yet it is particularly desirable to formulate the vinyl paste sealant such that it effectively bonds to such oil coated metal. The same holds true with respect to glass. It is particularly desirable to employ a vinyl paste sealant which adheres effectively to ordinary plate glass which has not been specially treated, particularly to remove dust or oils or greases attached to the surface thereof. At the same time, the sealant must possess good surface hardness, good flexibility, high tensile strength, adequate elongation, and the like considerations.

A particularly severe test for any sealant is one which comes about when a vinyl paste sealant is applied to a freshly coated steel part. This is particularly a problem with respect to electro-coated metal parts where the electro-coating thereon is an epoxy ester composition. Such known compositions are employed in the priming of automotive bodies where the steel automotive body is electro-coated with an aqueous dispersion, such as an emulsion, of an epoxy ester resin. The coated steel part is thereafter dried, and immediately after drying, a sealant is applied directly to the coated steel part. Such a freshly coated surface is a difficult one to effectively bond a vinyl paste sealant, and as a result, undesirable peeling occurs at a later stage. This problem does not exist after the epoxy coated steel part has been properly aged, for example, for a period of days to weeks. In such a case, there apparently is a total evaporation of any residual water contents that exists after the initial drying of the primed surface. However, it is most desirable that a vinyl paste sealant bond to such freshly dried epoxy coated metal parts which apparently contains a small residue of water.

There is described herein a vinyl paste sealant, which may be a plastisol, organosol, a plastigel or an organogel, which adheres excellently to essentially any type of substrate, and, in particular, adheres excellently to freshly dried electro-coated epoxy ester coated metal. The vinyl paste composition of this invention possesses all of the desirable physical properties one seeks in a sealant formulation and therefore may be employed for essentially any purpose for which vinyl paste sealants have been employed by the art. The vinyl paste sealant of this invention may be excellently bonded to oil coated metal, to conventional plate glass, to wood, to essentially any organic coating, and it possesses the proper viscosity characteristics such that it can be employed to fill spaces, such as holes, between two steel parts or two glass surfaces or metal glass surfaces, and the like.

The vinyl paste composition of this invention may be applied in any of the conventional ways, such as by extrusion, e.g., with a caulking gun, knife coating, painting with a brush or roller upon a surface, and the like. The composition of this invention is stable and can be stored for a long period provided it is kept in a closed container. Special precautions are not necessary in order to prevent the composition of this invention from drying or hardening while in a container.

The composition of this invention comprises six critical ingredients. The critical ingredients can be generally described as follows: a dispersion resin; a blending resin; a ketone-aldehyde condensation resin; a filler; a plasticizer; and a hydrolyzable organo-functional silane adhesion promoter.

The dispersion resin which is employable in the practice of this invention is a finely-divided polyvinyl chloride resin or a finely-divided vinyl chloride-vinyl acetate copolymer resin. In the case of the copolymer resin, the vinyl acetate content is typically not more than about 10% by the weight of the resin. Preferably, the vinyl acetate content does not exceed about 6% by the weight of the resin. The dispersion resin is characterized by having a relatively fine particle size. Its average particle size ranges from about 0.5 to about 2 microns, preferably from about 0.75 to about 1.25 microns. Such dispersion resins are made by the emulsion polymerization of vinyl chloride or vinyl chloride in combination with the required amount of vinyl acetate. It is desirable that the dispersion resin have a high molecular weight such as one characterized by an inherent viscosity exceeding about 0.90, typically at least about 1.00, determined at 30° C. from a solution of .2 gram of the resin in 100 milliliters of cyclohexanone (ASTM D-12-43).

The blending resin characterized above is one which has an average particle size distribution which is considerably larger than that of the dispersion resin. Such blending resins are typically produced by the suspension polymerization of vinyl chloride alone or in combination with vinyl acetate. The resulting polymer contains at least about 90 weight percent vinyl chloride therein and, therefore, may contain up to about 10 weight percent of vinyl acetate. Most preferred in the practice of this invention is a homopolymer of vinyl chloride. Such blending resins have an average particle size which ranges from about 10 microns to about 115 microns, preferably from about 20 microns to about 100 microns. A particular desirable polyvinyl chloride blending resin is one which contains an average particle size of about 60 microns. Such blending resins typically have an inherent viscosity of at least about 0.90, usually at least about 0.92, which inherent viscosity is determined as described above.

The ketone-formaldehyde resins are of three basic types: one is a cyclohexanone-formaldehyde condensation product, another is a methyl ethyl ketone-formaldehyde condensation product; and the third is an acetophenone-formaldehyde condensation product. Such resins are thermoplastic and are known to be being useful in vinyl paste sealant formulations.

With respect to the condensation product of cyclohexanone and formaldehyde, that resin has the following physical properties:

ring and ball softening point: 205° F.
color (50% in methyl ethyl ketone), Gardner: 1
specific gravity: 1.16
solids: 100%
physical form: ¼-inch chips The product described above is sold under the trademark of Bakelite Polyketone Resin 250, by Union Carbide Corporation, 270 Park Ave., New York, N.Y. 10017.

The methyl ethyl ketone-formaldehyde condensation resins have good compatability with a wide variety of coating resins. Such a resin is one which is characterized by the following physical properties:

color (50% in methyl ethyl ketone), gardner: 10 maximum
softening point: 200–220° F.
specific gravity: 1.16–1.19
solubility in aromatic hydrocarbons, ketones, esters, and alcohols The methyl ethyl ketone-formaldehyde condensation resin having the above described physical properties is sold under the trademark of Bakelite Polyketone Resins 251, by Union Carbide Corporation, 270 Park Avenue, New York, N.Y. 10017.

The acetophenone-formaldehyde condensation resin described above can be characterized by the following physical properties:

color (50% in methyl ethyl ketone), gardner: 5 maximum
sofrtening point: 165–185° F.
specific gravity: 1.17–1.20
soluble in aromatic hydrocarbons, ketones, and ester solvents.

The acetophenone-formaldehyde condensation resin having the above physical properties is sold under the trademark of Bakelite Polyketone Resin 252, by Union Carbide Corporation, 270 Park Avenue New York, N.Y. 10017.

The fillers suitable for the practice of this invention are alkaline earth metal carbonates or sulfates such as calcium carbonate, barium carbonate magnesium carbonate, calcium sulfate, barium sulfate, or magnesium sulfate. One of the desirable characteristics of a filler employed in the practice of this invention is that it should not be of a type which reacts with the silane adhesion promoter component insofar as such adhesion promoters are caused to react on the surface of such fillers to form siloxane coatings thereon. Fillers such as the siliceous fillers typically react with the silane adhesion promoters by hydrolysis of the silane with the surface hydroxyl or bound water of the siliceous filler to form siloxane coatings thereon and this tends to use up to silane adhesion promoter such that it is not available as a integral blend component which enhances adhesion at the substrate surface to which the sealant is applied. For this reason, the alkaline earth metal carbonates and sulfates are particularly desirable insofar as they contain a lesser quantity of surface water either of the bound or free type. As a result, the silane adhesion promoter is not spent in coating such fillers and is present in the sealant formulation so as to enhance the bonding of the sealant to the substrate to which it is applied.

The plasticizer that is employed may be any of the usual plasticizers for vinyl pastes. Particularly desirable in the practice of this invention are the phthalate plasticizers. Such phthalates are the diesters of phthalic acid in which the ester moiety is from an alcohol containing at least 6 carbon atoms. Illustrative of such plasticizers are di-n-hexyl phthalate, di - 2 - ethylhexyl phthalate, di - n - octyl phthalate, di-isodecyl phthalate, mixed esters such as 2-ethylhexyl isodecyl phthalate, 2-ethylhexyl octyl phthalate, and the like. The particular plasticizer that one employs is dependent upon the properties one seeks in the sealant insofar as temperature performance characteristics, viscosity or rheology characteristics, fusion characteristics, and the like considerations.

The silane adhesion promoter employable in the practice of this invention is characterized by the following:

First, it must contain a silicon atom to which is bonded 3 hydrolyzable groups, such as alkoxy containing 1 to 3 carbon atoms, alkoxyalkoxy such as ethoxyethoxy, methoxyethoxy, and the like; and secondly, contain an organo-functional group which contains at least one primary amino group or one amido group in which the nitrogen thereof contains at least two hydrogens bonded directly to nitrogen. The nitrogen functionality is present in an organic group which is bonded to the silicon through a siliconcarbon bond. Such silane adhesion promoters are characterized as possessing a single organo-functional group and 3 hydrolyzable groups such that when the silane is contacted with moisture contained on a surface or water which is embodied within the sealant formulation, the hydrolyzable groups are converted to silanol groups which in turn condense to form siloxane. When such adhesion promoters are incorporated into the sealant formulation and the formulation is applied to a substrate, the adhesion promoter migrates to the substrate surface to form thereat a siloxane coating which acts to bond the sealant tenaceously to the substrate.

A further characterization of the silane adhesion promoters employable in the vinyl paste sealant composition of this invention are those which are characterized by the following formula:

(I) $H_y$—[HN—]$_x$[—R—Si(OR')$_3$]

wherein $x$ is a whole number having the value of at least 1, $y$ is at least 1, R is a polyvalent aliphatic organic group bonded to nitrogen and silicon which contains at least 3 carbon atoms in sequence separating the [—NH—] from silicon and is bonded to silicon by a carbon to silicon bond; R' is one of alkoxy or alkoxyalkoxy as described above; and each nitrogen is covalently bonded to carbonyl of R or a noncarbonyl carbon atom R.

The silanes may contain only a primary amino group, in which case, the silane is a monoamino silane as gamma - aminopropyl(triethoxy)silane; gamma - aminopropyl(trimethoxy)silane; delta - amino - n - butyl (trimethoxy)silane, gamma-aminoisobutyl(triethoxy) silane, and the like. The silane may also contain both primary and secondary amino groups such as is the case with, for example, N - beta - aminoethyl-gamma-aminopropyl(trimethoxy)silane, N - trimethoxysilylpropyl diethylene triamine, N-trimethoxysilylpropyl polyethyleneimine, and the urea adducts of the aforementioned amino silanes formed by the reaction of, for example, ethyl carbamate or methyl carbamate with the aforementioned amino silanes, see commonly assigned copending application Ser. No. 729,895, filed May 17, 1968. Most desirable are the aminohydrocarbyltrialkoxysilanes and the ureidohydrocarbyl trialkoxysilanes described above.

As noted above, the plasticizers of choice are the phthalates. Instead of the phthalate plasticizers one may employ other types of ester plasticizers such as the alkyl esters described above with respect to the phthalates of, for example, adipic acid, azeleic acid, sebacic acid and the dimerized acids such as dimerized linolenic acid, linoleic acid, and the like. However, when such plasticizers other than the phthalate plasticizers are employed, one notes a dropping of the adhesion capabilities of the vinyl paste sealant. It has been noted that if one adds a small quantity of a cycloaliphatic epoxide to the sealant formulation when such plasticizers are employed, that the adhesion qualities are upgraded to the level desired. For example, one might add in such cases a cycloaliphatic epoxide such as 3,4-epoxy-cyclohexylmethyl 3,4-epoxy-cyclohexanecarboxylate. This cycloaliphatic epoxide when so employed is noted to provide after fusion of the sealant a lighter color than would be obtainable in the absence of such cycloaliphatic epoxides. Such lighter color is an added advantage to the adhesion characteristic noted.

One may also employ in the formulation, any of the conventional polyvinyl chloride stabilizers such as dibasic lead phosphite, and any of the other conventional metal salts employed for the purpose of stabilizing polyvinyl chloride pastes such as the barium, calcium and cadmium type salts. An exception in this regard is the utilization of tin mercaptides which it is noted will oftentimes adversely affect the function of the sealant in its performance characteristics.

One may also employ a filler composition which serves the function of sequestering any water which is present in the formulation. Such materials are any of the known desiccant type solids such as calcium oxide, calcium chloride, anhydrous calcium sulfate, and the like. The desiccant of choice is calcium oxide.

If one wishes to alter the rheology of the composition, such as making the sealant composition thixotropic, one may add small quantities of finely ground asbestos. The use of such in the formulation is dependent upon the desired viscosity characteristics for the particular use one employs the sealant.

Illustrative of the amounts of the aforementioned components of the vinyl paste sealant are set forth in the following table:

TABLE

| Ingredients | Amount (parts by weight) | | |
|---|---|---|---|
| | Preferred | Minimum | Maximum |
| Vinyl dispersion resin | 30 | 10 | 90 |
| Vinyl blending resin | 30 | 10 | 90 |
| Ketone-formaldehyde resin | 40 | 5 | 50 |
| Dibasic lead phosphite | 3 | 0 | 5 |
| Filler (e.g. CaCO$_3$) | 150 | 5 | 350 |
| Desiccant (e.g. calcium oxide) | 15 | 0 | 50 |
| Asbestos | 2 | 0 | 15 |
| Plasticizer | 70 | 25 | 150 |
| Cycloaliphatic epoxide [1] | 5 | 0 | 10 |
| Silane adhesion promoter [2] | 1.5 | 0.1 | 3.0 |

[1] 3,4-epoxy-cyclohexylmethyl 3,4-epoxycyclohexane carboxylate.
[2] For example: $H_2NCH_2CH_2NHCH_3CH_2NHCH_2CH_2CH_2Si(OCH)_3$.

In practicing the above formulation with respect to an ultimate embodiment thereof, the dispersion resin may be one which possesses an inherent viscosity of 1, an average particle size of about 1 micron, and is a copolymer of vinyl chloride and vinyl acetate containing about 5 weight percent vinyl acetate and 95 weight percent vinyl chloride. This dispersion resin is characterized as Bakelite VLFV, a trademarked product of Union Carbide Corporation, 270 Park Ave., New York, N.Y. 10017. A particular and most specific characterization of a vinyl blending resin mentioned previously is Bakelite QYPM, which has an inherent viscosity of .95 to 1.0, and an average particle size of about 60 microns. Bakelite QYPM is a trademarked product of Union Carbide Corporation, 270 Park Ave., New York, N.Y. 10017. In the formulation described in the above table, the plasticizer most preferred is diisodecyl phthalate. Also, in the above formulation, the most preferred ketone-fomaldehyde resin is the cyclohexanone-formaldehyde condensation resin described previously, specifically with respect to Bakelite Polyketone Resin 250.

The aforementioned formulation, particularly the preferred formulation set forth in the above table, when deposited on a steel panel freshly electrocoted with conventional epoxy ester resins, and cured at 171° C. for 35 minutes, provides excellent adhesion to the coating and can only be removed with cohesive failure of the sealant rather than the bond between the sealant and the epoxy coating. In addition, the sealant is similarly bonded to glass, oil coated metal such as oil coated steel, and the like.

The sealants may be formulated in any of the conventional blending equipment normally employed in the manufacture of viscous materials such as sealants. For example, the blend may be effected in a planetary mixer, a conventional dough kneader, a paddle-type mixers, an extruder, a Banbury mixer, a two or three roller rubber mills, and the like. Normally, such sealants are not blended in high speed shear mixers, such as a Cowles mixer, an air mixer, or a Waring Blender.

The order of addition of the ingredients is not critical to the practice of this invention. Some features should be mentioned, however, to enable those who are not skilled in the manufacture of sealants of the type described above to practice the invention with rapid facility. For example, the ketone-condensation resins which are normally solid particles should be dispersed first in the plasticizer in order to dissolve them for use in the formulation. In addition, when effecting admixture of the various components of the sealant, one should insure that not less than conventional mixing practices are employed to effect distribution of the solids in at least a liquid phase such as the plasticizer. Hence, one should incorporate the plasticizer with part of the solid components or all of the solid components when effecting admixture so as to achieve the uniform distribution desired in a practical manner.

Though the above description has been specific with respect to plastisol formulations, the sealant formulations can be made in the form of an organosol, a plastigel or an organogel. To convert the aforedescribed plastisol formulation to an organosol, one may add the conventional volatile liquids which are known in the art to effect such conversion. For example, one can add from about 5 to about 20 weight percent, preferably from about 5 to 10 weight percent, based on the weight of the total composition, of a volatile liquid such as glycol ethers such as diethyl ether of ethylene glycol, dimethylether of ethylene, dimethylether of diethylene glycol, and the like; and diluent type thinners such as the parafinic, cycloparafinic, terpene and aromatic hydrocarbons, such as mineral spirits, terpentine, toluene and xylene, and the like. Desirably, the boiling point of the thinner should range from about 100° C. to about 200° C., and preferably, the boiling point of the thinner should exceed the fusion or curing temperature of the organosol, and thus, in general, the boiling point of the thinner is most desirably in excess of 170° C.

To convert the plastisol formulations and the organosol formulations described above, to a plastigel or a organogel, respectively, one simply adds the conventional gelling agents used for this purpose. For example, organophilic bentonite and silica aerogels, as well as the asbestos described above, can be employed for the purpose of gelling the composition to obtain the desired viscosity characteristics which one expects of a plastigel or an organogel. Conventional processes known in the art for forming plastigels and organogels may be employed. For example, the filler material which serves the purpose of acting as a gelling agent can be fed in predispersed form in the conventional manner to the formulation. With respect to the manufacture of an organosol, the volatile liquid ingredient is added to the plastisol formulation to form the organosol. Such gelling agents may be employed in the amounts which has been described above with respect to the asbestos additive.

Though this invention has been described with respect to a number of details thereof, it is not intended that such details should act to limit the scope of this invention.

What is claimed is:

1. A sealant composition possessing excellent adhesion properties which comprise the following as essential ingredients thereof, in parts by weight; a finely divided vinyl chloride dispersion resin which has an average particle size from about 0.5 to about 2 microns in the amounts of 10 to about 90 parts by weight; a vinyl chloride blending resin which has an average particle size from about 10 to about 115 microns in amounts of about 10 to about 90 parts by weight; a ketone-formaldehyde resin in amounts on about 5 to about 50 parts by weight; an alkaline earth metal carbonate or sulfate in amounts of about 5 to about 350 parts by weight; a plasticizer for such vinyl chloride resin in amounts of from about 25 to about 150 parts by weight; and a silane adhesion promoter which comprises an organo-functional trihydrolyzable silane wherein the organo-functional group is bonded to silicon by a carbon to silicon bond and the organo-functionality is an $NH_2$ group.

2. The composition of claim 1 wherein the vinyl chloride dispersion resin is a polyvinyl chloride resin or a finely divided vinyl chloride-vinyl acetate copolymer resin, having an inherent viscosity exceeding about 0.90, determined at 30° C. from a solution of 0.2 gram of the dispersion resin in 100 milliliters of cyclohexanone.

3. The composition of claim 2 wherein the vinyl chloride blending resin has an inherent viscosity of at least about 0.90, determined at 30° C. from a solution of .2 gram of the blending resin in 100 milliliters of cyclohexanone.

4. The composition of claim 3 wherein the ketone-formaldehyde resin is a cyclohexanone-formaldehyde condensation product.

5. The composition of claim 3 wherein the plasticizer is a phthalate ester.

6. The composition of claim 3 wherein the silane is an amino-hydrocarbyl trialkoxy silane.

7. The composition of claim 4 wherein the filler is calcium carbonate.

8. The composition of claim 5 wherein the phthalate ester is diisodecyl phthalate.

9. The composition of claim 8 wherein there is provided a small amount, up to about 15 parts by weight, of asbestos.

10. The composition of claim 9 wherein there is provided up to about 50 parts by weight of a particulate dessicant.

References Cited
UNITED STATES PATENTS

| | | | |
|---|---|---|---|
| 3,423,357 | 1/1969 | Suh | 260—31.8 R |
| 3,539,480 | 11/1970 | Groff | 260—828 |
| 3,290,165 | 12/1966 | Iannicelli | 260—37 N |

ALLAN LIEBERMAN, Primary Examiner

P. R. MICHL, Assistant Examiner

U.S. Cl. X.R.

260—41 R; 117—75

UNITED STATES PATENT OFFICE
CERTIFICATE OF CORRECTION

Patent No. 3,772,237　　　　　　　　Dated November 13, 1973

Inventor(s) Allan R. Bullman

It is certified that error appears in the above-identified patent and that said Letters Patent are hereby corrected as shown below:

Column 3, line 70, "gardner" should read --Gardner--.
Column 4, line 10, "gardner" should read --Gardner--;
line 12, "sofrtening" should read --softening--; line 34, after "use up" delete "to" and insert --the--.
Column 6, line 22, the formula should read:

$H_2NCH_2CH_2NHCH_2CH_2NHCH_2CH_2CH_2Si(OCH_3)_3$ ; line 46, "electrocoted" should read --electrocoated--. Column 7, line 16, after "one" insert --glycol--.

Signed and sealed this 17th day of June 1975.

(SEAL)
Attest:

RUTH C. MASON
Attesting Officer

C. MARSHALL DANN
Commissioner of Patents
and Trademarks